United States Patent [19]

Farr et al.

[11] 3,713,270

[45] Jan. 30, 1973

[54] HYDROGEN DIFFUSION MEMBRANES

[75] Inventors: John P. G. Farr; Ivor Rex Harris, both of Warwickshire, England

[73] Assignee: National Research Development Corp., London, England

[22] Filed: May 24, 1971

[21] Appl. No.: 146,516

[30] Foreign Application Priority Data

May 27, 1970 Great Britain..................25512/70

[52] U.S. Cl. .....................55/16, 55/158, 75/172
[51] Int. Cl. ..........................B01d 59/12, C22c 5/00
[58] Field of Search ...................55/16, 158; 75/172

[56] References Cited

UNITED STATES PATENTS 3,148,031  9/1964  Vahldieck ...............................55/16
3,238,700  3/1966  Cohn.......................................55/16

FOREIGN PATENTS OR APPLICATIONS 981,535   1/1965   Great Britain..........................75/172
547,144   10/1957  Canada ..................................75/172

Primary Examiner—Charles N. Hart
Attorney—Finnegan, Henderson, Farabow & Garrett

[57] ABSTRACT

Membranes suitable for use in the separation of hydrogen from gaseous mixtures containing hydrogen, comprise an alloy of palladium and one or more elements selected from the group consisting of Yttrium and the Lanthanides but excluding Lanthanum and Praseodymium. Palladium-cerium and palladium-yttrium membranes are particularly suitable for use in the separation process.

18 Claims, No Drawings

HYDROGEN DIFFUSION MEMBRANES

This invention relates to hydrogen diffusion membranes.

For some time membranes made from palladium and alloys of palladium such as palladium-silver have been used for separating hydrogen from a mixture of gases containing hydrogen. The gaseous mixture is brought into contact with one side of a membrane and diffused hydrogen is recovered from the other side. The use of palladium itself in such a process gives rise to a serious disadvantage in that the metal suffers from metallurgical changes due to contact with hydrogen, which reduce it service life. This disadvantage may be overcome to some extent by the use of a membrane made, for example, from a palladium-silver alloy, but it is then necessary for the membrane to be heated to high working temperatures such as 300° C or more to minimize adverse metallurgical changes which give rise to defects such as holes and cracks.

It has now been found that certain palladium alloys may be incorporated in membranes which are useful in hydrogen diffusion processes at relatively lower temperatures and which possess good metallurgical stability. These alloys in many cases possess much greater mechanical strength than the palladium-silver alloys used hitherto and thinner membranes may be employed or higher pressure differentials and consequently higher rates of diffusion may be obtained. Additionally the alloys usually have relatively higher permeabilities at a given operating temperature and satisfactory permeabilities at lower operating temperatures than are satisfactory with palladium silver alloys.

According to the present invention a membrane suitable for use in the separation of hydrogen from gaseous mixtures containing hydrogen comprises an alloy of palladium and one or more elements selected from the group consisting of Yttrium and Lanthanides excluding Lanthanum and Praseodymium. By the term Lanthanides is meant those elements with atomic numbers from 57 to 71 located at Group IIIA of the short-period form of the Periodic Table. Throughout the specification the term membrane means a barrier which is permeable to hydrogen and which may take the form, for example, of a foil or tube. Such a membrane may serve as an electrode.

Alloys of palladium with cerium and palladium with yttrium especially those containing up to 12 atomic percent cerium or up to 12 percent yttrium are particularly suitable for use in the membranes of the present invention and Pd-Ce alloys containing between 5 and 7 percent cerium, e.g., 6.5 percent which are solid solution, have given excellent results. Minor amounts of impurities may be present and if desired, cerium or yttrium mischmetal may be used wholly or partly to replace pure cerium or yttrium in the alloys.

Cerium and yttrium are preferred as alloying metals but lanthanides having comparable atomic size similarly effect an expansion of the palladium crystal lattice to which the benefits of the invention may be attributable. The permeability characteristics of the alloys are believed to depend upon both the degree of lattice expansion and the ratio of electrons to atoms (the electron/atom ratio) in the alloy. It will be appreciated therefore that whereas with Pd-Ce alloys the preferred composition lies in the range 5–7 atomic percent cerium, the preferred composition for the other alloys, e.g., yttrium, is somewhat higher, i.e., 7–9 percent, for instance 8.5 percent because cerium exists in the $Ce^{4+}$ state in the alloy whereas the other elements exist in the 3+ state.

In the past it has often been found necessary to provide mechanical support for a membrane when subjected to a high pressure differential but the increased mechanical strength possessed by membranes made from the alloys of the present invention make it possible in many such cases and in particular with the palladium-cerium alloys to omit a support. If desired, membranes according to the present invention may be demountable whereas it has in general been necessary previously to braze the membranes in position, pressure-tight mechanical joints usually being precluded because of their low strength and the high operating temperatures employed.

The desired membrane can in many cases be prepared from a cast ingot by a sequence of procedures which preferably includes cold working, e.g., cold rolling and annealing; fabrication is preferably effected when the alloy is fully annealed. The permeability of the membranes can be improved by conventional palladising, i.e., by electroplating with palladium. Alternatively or additionally the permeability of the membranes can be improved by surface abrasion.

It will be appreciated that the present invention includes within its scope an improved process for the separation and/or purification of hydrogen.

Accordingly, a process for the separation and/or purification of hydrogen comprises contacting a mixture of gases containing hydrogen with a membrane in accordance with the present invention. The membranes are effective in separating pure hydrogen from commercial grade hydrogen gas, for example, or from mixtures of hydrogen with $N_2$, $O_2$, $CO_2$ or Argon.

The operating conditions of pressure and temperature for securing the optimum commercial advantage for the process may be determined by simple experiment. Palladium-cerium membranes have however operated satisfactorily at pressure differentials of 300 psi. and 300° C but commercial considerations may require the use of higher pressure differentials, e.g., 750 psi. and/or lower temperatures such as 200° or lower. The membranes of the present invention may also be employed in the separation of hydrogen isotopes one from another as well as from a mixture including other gases and may also find application in the catalytic production of atomic hydrogen, from molecular hydrogen supplied to one side of a membrane, atomic hydrogen being produced on the other side.

The membranes of the present invention may also find application in processes of catalytic hydrogenation or dehydrogenation. In the former application hydrogen or a mixture of gases containing hydrogen can, with convenience, be supplied to one side of a membrane and hydrogenation of the substrate can be effected on the other side by hydrogen permeating the membrane.

Diffusion membranes also find application in processes wherein hydrogen is prepared or used electrolytically, e.g., in controlling the pH of feed water by adjustment of the hydrogen ion concentration. In such processes, membranes which act as electrodes and which are permeable to hydrogen at room temperature are required by when made from palladium or some palladium alloys, including palladium/silver, these electrodes deteriorate in mechanical strength and eventually disintegrate. Electrodes made from the alloys of the present invention and particularly Pd-Ce alloys readily transmit hydrogen and high electrocatalytic activity is possible without such deterioration.

The invention is illustrated by the following Examples:

EXAMPLE I

A palladium-6.5 atomic percent cerium alloy is prepared by d.c. arc melting in low pressure argon. The cast ingot in homogenized by heating at 900° for one week before being cold rolled to sheet 0.004 and 0.002 inches thick with intermediate anneals at 800° C after successive reductions in thickness of 50 percent. The fully annealed alloy has a 0.2 percent Proof Stress in excess of 44 k.p.s.i. and an Ultimate Tensile Strength in excess of 80 k.p.s.i.

Discs of annealed 0.004 inch thick alloy sheet are cut to fit commercially available high vacuum bolted flanges. The vacuum-tight demountable joints are used with a copper gasket on one side of the membrane, the other side abutting directly on the sealing lip of the opposite flange.

By employing a system in which cylinder-grade hydrogen is supplied to one side of the membrane and a vacuum (provided by a pump) is applied to the other, the membrane assembly being surrounded by a furnace, the results shown in Table I may be obtained. The high pressure side of the system is provided with a "-Bleed" allowing for slow but continuous replacement of hydrogen at the membrane surface. Ultra-pure hydrogen is produced on the low pressure side of the membrane.

The numerical data for Pd-Ce given in Table I do not constitute absolute values, but allow valid comparisons to be drawn with data for membranes of Pd–23 at percent Ce subjected to comparable conditions.

TABLE I

| Pd-Ce (6.5 atomic %) Cold-rolled 0.004" thick non-abraded pressure differential: 1 atm Permeability | | Pd-Ag (23 atomic %) Cold rolled 0.0004" thick non-abraded pressure differential: 1 atm Permeability | |
|---|---|---|---|
| $t^a$(°C) | J(cc/sec.cm$^2$)/ 1 atmosphere | $t^a$(°C) | J(cc/sec.cm$^2$)/ 1 atmosphere |
| 349 | $2.06 \times 10^{-2}$ | 358 | $1.83 \times 10^{-2}$ |
| 325 | $1.85 \times 10^{-2}$ | 310 | $1.37 \times 10^{-2}$ |
| 299 | $1.50 \times 10^{-2}$ | 268 | $8.85 \times 10^{-3}$ |
| 265 | $1.10 \times 10^{-2}$ | 245 | $7.51 \times 10^{-3}$ |
| 237 | $9.02 \times 10^{-3}$ | 230 | $6.20 \times 10^{-3}$ |
| 199 | $6.35 \times 10^{-3}$ | 195 | $4.13 \times 10^{-3}$ |
| 150 | $3.28 \times 10^{-3}$ | 155 | $3.54 \times 10^{-3}$ |
|   |   | 105 | $1.62 \times 10^{-3}$ |

EXAMPLE II

By employing the system of Example I, the effect of pressure differential of membranes of Pd-Ce(6.5 atomic %) and Pd-Ag(23 atomic %) may be determined and is shown in Table II.

TABLE II

| Pd-Ce (6.5 atomic %) 0.004" thick; none-abraded $t^a$(300°C) | | Pd-Ag (23 atomic %) 0.004" thick; non-abraded $t^a$(300°C) | |
|---|---|---|---|
| P(p.s.i.) | Permeability J cc/sec.cm$^2$ | P(p.s.i.) | Permeability J (cc/sec.cm$^2$) |
| 60 | $1.24 \times 10^{-1}$ | 60 | $1.49 \times 10^{-1}$ |
| 90 | $2.07 \times 10^{-1}$ | 90 | $2.15 \times 10^{-1}$ |
| 120 | $2.90 \times 10^{-1}$ | 120 | $2.48 \times 10^{-1}$ |
| 150 | $3.39 \times 10^{-1}$ | 180 | $3.00 \times 10^{-1}$ |
| 180 | $3.81 \times 10^{-1}$ | 210 | $3.64 \times 10^{-1}$ |
| 210 | $4.14 \times 10^{-1}$ | 270 | $3.81 \times 10^{-1}$ |
| 240 | $4.97 \times 10^{-1}$ | 300 | $3.98 \times 10^{-1}$ |
| 270 | $5.97 \times 10^{-1}$ |   |   |
| 300 | $6.63 \times 10^{-1}$ |   |   |

EXAMPLE III

A palladium-10 atomic percent cerium alloy made into a membrane as described in Example I is cycled between 40° and 350° C under a continuous pressure differential of 150 p.s.i. hydrogen. No visible adverse changes are observed.

EXAMPLE IV 0.005" foils of a palladium-10 atomic percent cerium alloy subjected to at least 250 cycles (cathodic) 30 secs. and (anodic) 5 secs. at 0.5 mA/cm$^2$, in dilute sulphuric acid at 25° show no adverse structural changes when examined by transmission electron microscopy.

These results are set out in Table III.

TABLE III

| Metal | No. cycles | Condition |
|---|---|---|
| Pd | 10 + | dislocation networks visible (brittle and fragile) |
| Pd – 25% Ag | 50 + | dislocation networks visible |
| Pd – 10% Ce | 250 × | no dislocation networks visible |

+Pd and Pd Ag are considered too fragile to risk further use at this stage.
× Pd – 10% Ce unchanged, still usable.

EXAMPLE V

A palladium - 8.5 atomic percent yttrium alloy is prepared by d.c. arc melting in approximately 0.5 atmospheres argon. The arc-melted sample is homogenized by heating at 900° for 1 week and then subsequently cold-rolled to sheet 0.004" thick with intermediate anneals at 900° C after successive reductions in thickness of 50 percent. Discs of the annealed alloy are mounted and used as described in Example I to effect the separation of pure hydrogen from commercial grade hydrogen gas.

We claim:

1. A membrane suitable for use in the separation of hydrogen from gaseous mixtures containing hydrogen which comprises an alloy consisting essentially of palladium with one or more elements providing between five and twelve atomic percent of said alloy and selected from the group consisting of Yttrium and the Lanthanides excluding Lanthanum and Praseodymium.

2. A membrane according to claim 1 wherein the alloy is of palladium and up to 12 atomic per cent of one or more elements selected from the group consisting of Yttrium and the Lanthanides excluding Lanthanum and Praseodymium.

3. A membrane according to claim 1 wherein the alloy is a solid solution.

4. A membrane according to claim 1 wherein the alloy is of palladium and cerium.

5. A membrane according to claim 4 wherein the alloy is of palladium and from 5 to 7 atomic per cent cerium.

6. A membrane according to claim 5 wherein the alloy is of palladium and 6.5 atomic per cent cerium.

7. A membrane according to claim 1 wherein the alloy is of palladium and yttrium.

8. A membrane according to claim 7 wherein the alloy is of palladium and from 7 to 9 atomic per cent yttrium.

9. A membrane according to claim 1 which is fully annealed.

10. A membrane according to claim 1 which is palladized.

11. A membrane according to claim 1 the surface of which is abraded.

12. A membrane according to claim 1 in the form of a tube.

13. Apparatus for the separation of hydrogen from gaseous mixtures containing hydrogen or for the purification of impure hydrogen which incorporates a membrane comprising an alloy consisting essentially of palladium with one or more elements providing between five and 12 atomic percent of said alloy and selected from the group consisting of Yttrium and the Lanthanides excluding Lanthanum and Praseodymium.

14. A process for the separation and/or purification of hydrogen in which a mixture of gases containing hydrogen is contacted with a membrane comprising an alloy consisting essentially of palladium with one or more elements providing between five and 12 atomic percent of said alloy and selected from the group consisting of Yttrium and the Lanthanides excluding Lanthanum and Praseodymium.

15. Process according to claim 14 wherein a pressure differential at least 300 p.s.i. is maintained across the membrane.

16. Process according to claim 15 wherein the pressure differential is 750 p.s.i.

17 Process according to claim 14 wherein the temperature of the membrane is no greater than 300° C.

18. Process according to claim 17 wherein the temperature of the membrane is no greater than 200° C.

* * * * *